Aug. 9, 1966     S. R. TYLER ETAL     3,265,000

FLUID METERING DEVICE

Filed Sept. 3, 1963     2 Sheets-Sheet 1

INVENTORS
STANLEY R. TYLER &
BY   LEWIS W. MANSON

Reynolds & Christensen

ATTORNEYS

INVENTORS
STANLEY R. TYLER &
BY LEWIS W. MANSON

Reynolds & Christensen
ATTORNEYS

United States Patent Office 3,265,000
Patented August 9, 1966

3,265,000
FLUID METERING DEVICE
Stanley R. Tyler and Lewis W. Manson, Cheltenham, England, assignors to Dowty Fuel Systems Limited, Gloucester, England, a company of Great Britain
Filed Sept. 3, 1963, Ser. No. 306,071
Claims priority, application Great Britain, Sept. 3, 1962, 33,754/62
2 Claims. (Cl. 103—97)

This invention relates to fluid metering devices.

In accordance with the present invention a fluid metering device comprises a first valve member, a second valve member movable relatively to the first valve member along an axis and angularly about the axis to define a variable area orifice, and an actuator for the second valve member for movement thereof in a unique path relative to the first valve member within which axial and angular movements take place in varying proportions over the unique path, means being associated with the actuator and the second valve member to ensure that the ratio between incremental actuator movement and the resulting area change of the orifice becomes smaller with increase in orifice area.

The means may comprise a link pivotally connected at one position along its length to the first valve member and at another position along its length to the second valve member.

The second valve member may be a sleeve slidable axially and angularly on the first valve member, one end of the sleeve co-operating with an opening in the first valve member to define the orifice.

The present invention further provides a centrifugal pump comprising a casing, an impeller rotatively mounted in the casing, a fixed valve member located within a central recess in the impeller, a moving valve member also located within the central recess for both axial and angular movement relative to the fixed valve member about the impeller axis to define a radially directed variable area orifice within the recess, a link pivotally connected at one position of its length to the fixed valve member and at another position along its length to the moving valve member to locate the moving valve member for movement relative to the fixed member in a manner combining axial and angular movement, and an actuator to move the link about its pivot on the fixed valve member.

Figure 1:
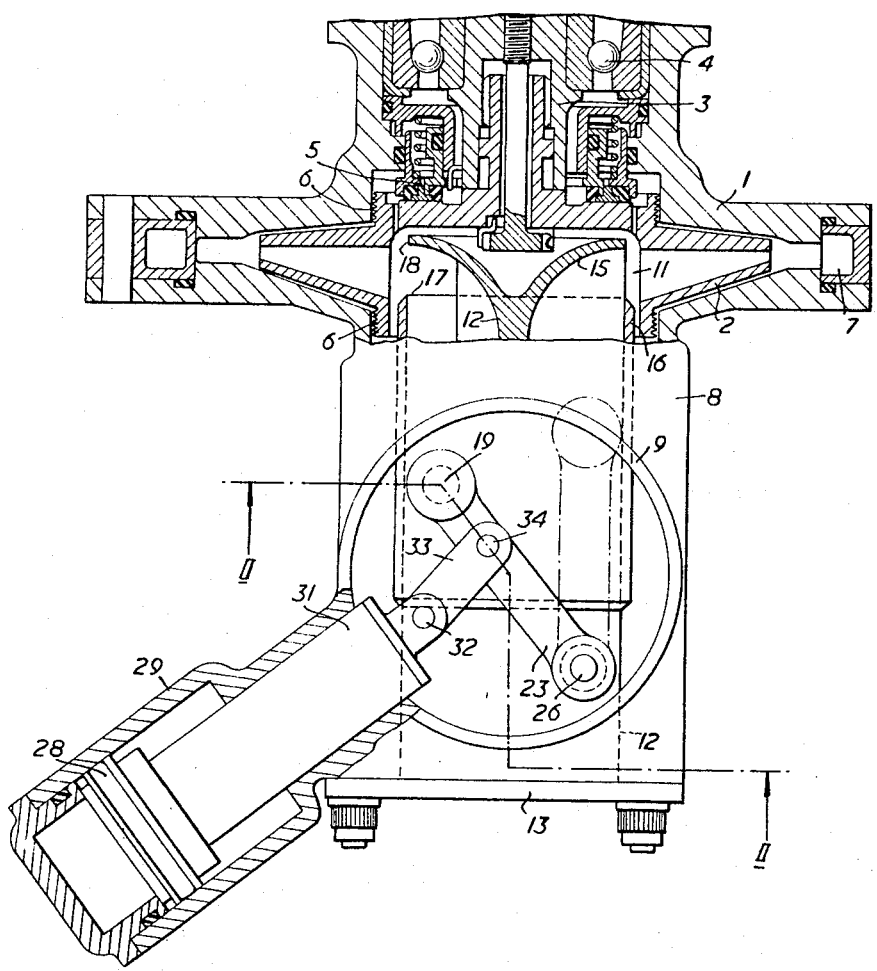
Figure 2:
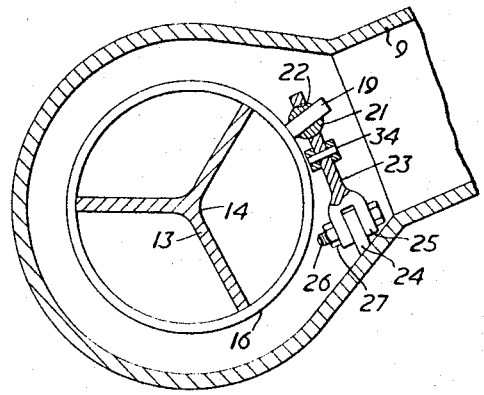
Figure 3:
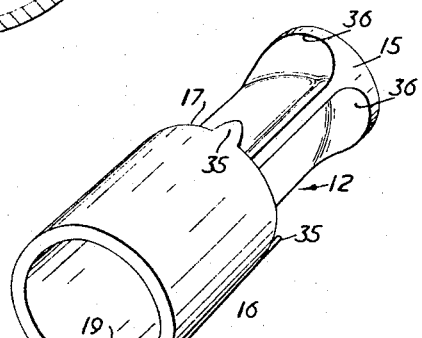
Figure 4:
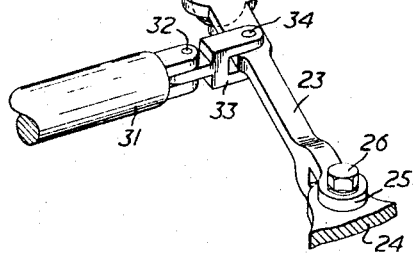
Figure 4:
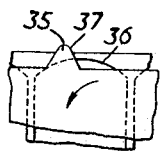
Figure 5:
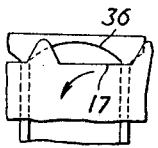
Figure 6:
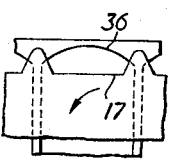

One embodiment of the invention comprising a combined control valve and centrifugal pump for the delivery of liquid fuel to a gas turbine engine will now be described with reference to the accompanying drawings in which, FIGURE 1 is a plan view partially in section of the combined pump valve, FIGURE 2 is a cross-section on the line II—II of FIGURE 1, FIGURE 3 is an isometric view of the link and valve sleeve of FIGURE 1 and including a modified form of the co-operating edges of the valve members, and FIGURES 4, 5 and 6 are diagrammatic views of the co-operating edges of the valve members of FIGURE 3 in three different relative positions.

Referring initially to FIGURES 1 and 2, the centrifugal pump comprises a pump casing 1 within which is located an impeller 2 of the shrouded type. The impeller 2 is rotatably mounted by a shaft 3 carried by bearings 4. A seal 5 provided on the shaft side of the impeller 2 prevents leakage of pump liquid back to the bearings. Either side of the impeller is provided with a dynamic seal 6 to reduce leakage. Around the periphery of the case a volute 7 is provided to receive the pumped liqued fuel and to deliver it to the gas turbine engine.

The side of the casing 1 opposite to the drive shaft 3 forms the entry housing 8 of the pump. This housing has an actual entry connection 9. The housing 8 opens to a central recess 11 of cylindrical form in the impeller 2. A fixed valve member 12 is fixedly secured to the end plate 13 of the housing 8 and extends into the central recess 11 of the impeller. The valve member 12 comprises three flanges 13 (see FIGURE 2) integrally formed with a central stem 14 and with a dished valve closure member 15. The valve member 15 is located within the recess 11. The edges of the flanges 13 are arranged parallel to the rotary axis of the impeller 2 and form the seating for a movable sleeve valve member 16. Within the recess 11 the member 16 terminates in a circular edge 17 which is capable of fitting closely over the edge 18 of the dished closure member 15. The sleeve 16 is axially slidable and angularly movable on the fixed valve member 12 and the edges 17 and 18 of the sleeve and the fixed valve member together define a variable orifice directed radially outwardly within central recess 11 of the impeller 2. The effective area of the orifice is adjusted by axial movement only of the sleeve 16. Angular movement of the sleeve 16 on its own cannot cause any variation in the spacing of the edges 17 and 18.

In order to control movement of the sleeve 16 the sleeve itself is provided with a radially extending pin 19 on which a spherical connecting member 21 is slidably mounted. The spherical member 21 is carried within a part-spherical recess 22 at one end of a link 23. The other end of the link 23 is pivotally connected to a lug 24 integrally formed within housing 8. The connection of the lever 23 to the lug 24 is by means of a bifurcated end 25 and a short spindle 26 which extends both through the bifurcated end and the lug. The spindle 26 is held in place by a suitable locking nut 27. The mounting of the lever 23 on lug 24 is such that pivotal movement of the link 23 is possible only about the axis of the spindle 26. On the other hand it will be seen that the connecting member 22 is a universal joint which permits pivotal movement of the link 23 about the pin 19 in a universal manner.

The actuator for adjusting the sleeve 16 comprises a servo piston 28 slidably mounted within a servo cylinder 29 formed as an extension of the housing 8. A piston rod 31 extending from a piston 28 enters the housing 8 and terminates in a pivot 32. From the pivot 32 a link 33 extends to a pivotal connection 34 on the link 23. Pivotal connection 34 is located in between the pivotal connections formed by the pin 19 of the spindle 26. The servo piston 28 is movable hydraulically within the cylinder 29 by control means of conventional form and may be located at any position within its stroke to determine an appropriate opening of the orifice within the impeller.

As shown in FIGURE 1, the servo piston 28 is positioned at one end of its stroke to determine the fully open position of the valve. In this position the link 23 is in a skewed relation to the axis of the impeller 2. Incremental angular movement of the link 23 from this position about the axis of the spindle 26 will cause both axial and angular movement of the sleeve 16. At the opposite end of the stroke of the servo piston 28 the link 23 will occupy the dotted line position of FIGURE 1. In this position a line passing through the centre of the spherical connector 21 perpendicularly to the axis of the spindle 26 lies in a plane passing through the axis of the sleeve 16. This arrangement insures that initial incremental movement of the pin 19 from the dotted line position of FIGURE 1 is entirely in the angular sense about the axis of the sleeve 16. In the dotted line position of the link 23 it is arranged that the edges 17 and 18 coincide exactly to give a substantially closed position of the valve.

The advantage obtained by the construction illustrated is that there is an approximately exponential relation between movement of the piston 28 and the area of the orifice formed between the edges 17 and 18. This exponential or approximately exponential relation is highly desirable since it allows accurate control of the orifice formed by the edges 17 and 18 over a large range. For example the arrangement described permits reduction of the orifice area down to 100th of its maximum opening with the same accuracy with which near maximum openings can be determined. Expressed accurately the exponential relation means that equal increments of movement of the piston 28 at any position within its range of movement will always cause the same fractional change in orifice area. Owing to the limited angular movement of the lever 23 it will be appreciated that movement of the servo piston 28 is substantially in direct proportion to angular movement of the link 23 and therefore that an approximately exponential relation will also exist between angular movement of the link 23 and the area of the valve orifice between the edges 17 and 18. An approximately exponential relation between actuator movement and orifice area is obtained if the ratio between incremental actuator movement and the resulting area change of the orifice becomes smaller with increase in orifice area.

FIGURE 3 is an isometric view showing the relative positions of the sleeve 16 and link 23 in a position corresponding to maximum opening of the valve. The fixed valve member 12 has for clarity been shown displaced axially from the sleeve 16. In FIGURE 3 there is a modification from the arrangement of FIGURES 1 and 2 in that the co-operating edges of the sleeve 16 and the dished valve closure member 15 are differently shaped. The edge 17 of the valve member 16 is provided with three equally-spaced lobes 35 whilst the edge of the valve closure member 15 is formed as three similar shallow curves 36. FIGURES 4, 5 and 6 illustrate the co-operation of the lobes 35 with the edges 36. Three similar orifices are formed around the fixed valve member but it is sufficient here to describe the adjustment of one of these orifices. Each lobe 35 includes an inclined edge 37 which co-operates initially with the edge 36. In the closed position of the valve the base of the lobe 35 will cover the peak of the curved edge 36. Initial incremental movement of the sleeve 16 brought about by the link 23 will cause opening of the orifice by movement of the edge 37 from the edge 36 in the peripheral sense only. Such opening results from the fact that the edge 36 and the co-operating part of the edge 37 each include components extending parallel to the axis of the sleeve 11. FIGURE 5 illustrates the approximately half-open position in which substantial axial as well as angular movement has taken place. Incremental adjustment of the orifice area results in this position both from axial and radial movement of the sleeve. FIGURE 6 shows the almost fully open position of the sleeve in which there is both axial and angular movement of the sleeve. However, incremental adjustment of the orifice area will now be determined almost entirely by axial movement of the sleeve since angular movement can now have substantially no effect on the peripheral length on the orifice.

The advantage obtained by the modified construction of FIGURES 3, 4, 5 and 6 lies in the fact that more accurate area control of the orifice may be exerted at very small orifice openings. This in turn results from the fact that co-operating edges when the orifices are very small have components extending parallel to the axis of the sleeve.

In operation of the pump and valve of either embodiment of the invention liquid at comparatively low but constant pressure is supplied to the inlet connection 9 of the pump. Liquid then flows between the sleeve 16 and the flanges 13 and flows radially from the orifice between the edges 17 and 18 into the passages within the pump impeller. A seal, not shown, co-operates between the outer surface of the sleeve 16 and the casing 8 to prevent flow of liquid along the outside of the sleeve into the impeller. The flow of liquid into the centrifugal impeller is therefore a function of the area of the orifice and the pressure of liquid at the entry connection 9. Preferably the centrifugal pump is arranged to operate as disclosed in connection with our U.S. application 80,967, now Patent No. 3,128,822, in which the impeller is so designed in conjunction with the speed that the pumped liquid forms an annulus around the impeller leaving a central core at the vapour pressure of the liquid. The flow rate of liquid into the pump is therefore determined by the pressure difference from the inlet 9 to the vapour pressure core and the size of the orifice. The radial depth of liquid in the impeller will adjust itself to cause such a flow rate of liquid to be delivered at pressure to the delivery connection of the pump.

In the described embodiments of the invention the moving valve member is in the form of a sleeve but it will be appreciated that many other forms of moving members are possible. For example, the moving valve member may comprise a mushroom valve supported by a stem, the mushroom head being movable axially and angularly relatively to a fixed valve seating. Also many variations are possible in the arrangement of the link and the constructions of the pivots. For example, both pivotal connections of the link may comprise ball joints or alternatively, instead of ball joints, other known forms of universal joint may be employed. If a ball joint or universal joint is used at either end of the link there is no need to provide a sliding connection as for example a sliding mounting of the sphere 21 onto pin 19 as shown in the described embodiment. Such a sliding connection becomes essential only where one pivotal connection of the link permits angular movement about one axis only, such for example as the pivotal connection of lever 23 at the spindle 26.

Whilst the described embodiments provide that initial opening movement of the moving valve member is solely angular it will be appreciated that it is equally possible for such initial movement to be solely axial by arranging that the pivot positions of the link lie in a plane perpendicular to the valve axis. The co-operating edges of the valve member must then include axial components to obtain the approximately exponential relation between actuator travel and orifice area.

We claim as our invention:

1. A variable area fluid metering device comprising a first valve member, a second valve member movable relatively to the first valve member along an axis whereby two co-operating edges of the valve members define a variable area orifice, a link pivotally connected at spaced positions along its length to the first and second valve members so that in the closed position the link is at least approximately parallel to the said axis, an actuator arranged to move the second valve member along a path including both angular and axial movements determined by said link, and axially extending components formed on the co-operating edges of the valve members, these components being located closely to one another in the closed position such that initial angular movement of the first valve member relative to the second valve member from the closed position effects opening of the valve by relative angular movement of the axial components and further opening of the valve results from the combined angular and axial movement of the valve members.

2. A centrifugal pump comprising a casing, an impeller rotatably mounted in the casing, a fixed valve member located within the central recess in the impeller, a moving valve member also located within the central recess for both axial and angular movement relative to the fixed valve member about the impeller axis to define a radially directed variable area orifice within the recess, a link pivotally connected at one position of its length to the fixed valve member and at another position along its length to the moving valve member to locate the moving valve member for movement relative to the fixed member in a fixed path combining axial and angular movement such that for movement of the moving valve member in one direction along the fixed path the dimensions of the orifice increase by both axial and angular movements and for movement of the moving valve member in the other direction along the fixed path the dimensions of the orifice decrease by both axial and angular movements.

References Cited by the Examiner

UNITED STATES PATENTS

| | | | |
|---|---|---|---|
| 1,053,154 | 2/1913 | Campbell | 103—97 |
| 1,597,794 | 8/1926 | Horseburgh | 251—215 |
| 1,823,455 | 9/1931 | Kirgan | 103—97 |
| 1,846,379 | 2/1932 | Anderson | 230—114 |
| 1,889,816 | 12/1932 | White | 230—114 |
| 2,290,770 | 7/1942 | Schumann | 230—114 |
| 3,030,006 | 4/1962 | Shoup | 230—114 |
| 3,057,541 | 10/1962 | Hasbrouck | 230—114 |

FOREIGN PATENTS 24,516  10/1913  Great Britain.

LAURENCE V. EFNER, *Primary Examiner.*